Figure 1:
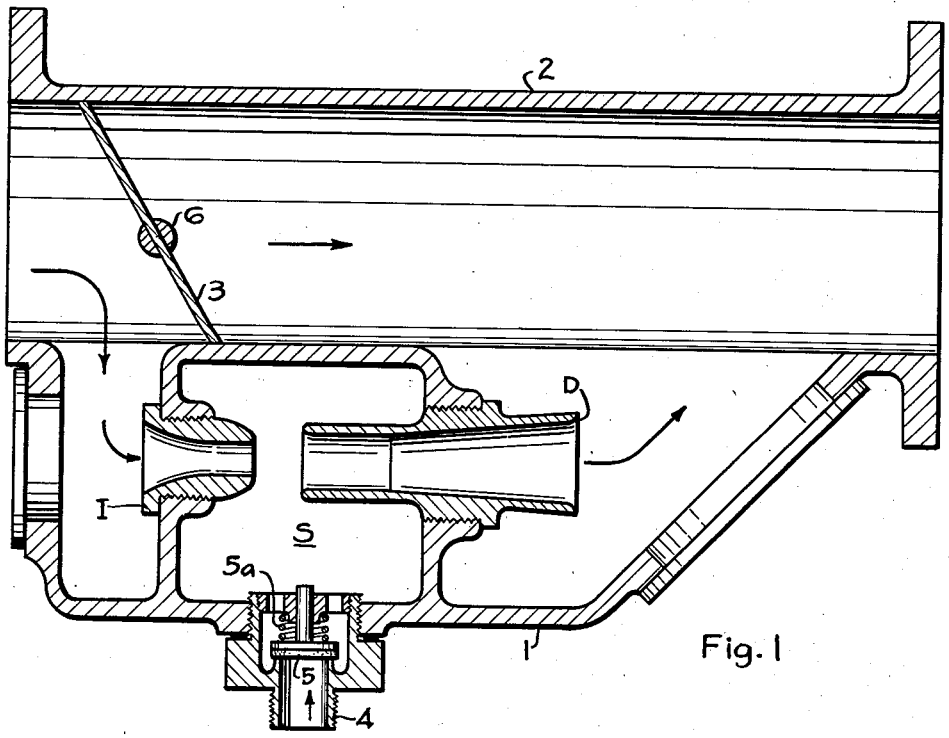

May 29, 1956  J. A. WOOLDRIDGE  2,747,783
LIQUID DISPENSING AND WITHDRAWING APPARATUS
Filed July 8, 1952  2 Sheets-Sheet 1

INVENTOR:
JAMES ARTHUR WOOLDRIDGE
BY: Oswald H. Milmore
HIS ATTORNEY

May 29, 1956     J. A. WOOLDRIDGE     2,747,783

LIQUID DISPENSING AND WITHDRAWING APPARATUS

Filed July 8, 1952     2 Sheets-Sheet 2

Inventor: James Arthur Wooldridge
By: Oswald H. Milmoe
His Attorney

United States Patent Office 2,747,783
Patented May 29, 1956

2,747,783
LIQUID DISPENSING AND WITHDRAWING APPARATUS

James Arthur Wooldridge, Great St. Helen's, London, England, assignor to Shell Development Company, Emeryville, Calif., a corporation of Delaware Application July 8, 1952, Serial No. 297,688

Claims priority, application Great Britain July 12, 1951

22 Claims. (Cl. 226—125)

This invention relates to apparatus for dispensing liquid from a supply source, such as a reservoir, to a receptacle and for withdrawing some or all of the liquid from the said receptacle and/or from the pipe or pipes leading to it. The invention finds especial, although not exclusive, application in connection with the fuelling of aircraft from a so-called static fuelling system in which liquid fuel is supplied from a static bulk storage tank, by way of a system of permanently laid pipes, to a plurality of dispensing points adjacent to the parking positions of the aircraft. The fuel in the whole system of pipes is pressurized by a pump at the bulk storage tank and is dispensed from any of the dispensing points by a dispensing hose carried on a truck or located permanently at the dispensing point, for example in a pit.

It is desirable to withdraw some or all of the fuel from the dispensing hose when fuelling has been completed, in order to relieve the pressure in the hose and to facilitate the handling and winding thereof. Such withdrawal of liquid from the hose is particularly desirable when the hose is of the type which flattens or collapses when it is evacuated after closing the nozzle end, e. g., by a valve or by applying a closure; however, withdrawal of liquid is also often desirable in the case of rigid or semi-rigid hoses which are not collapsed. Again, it is sometimes necessary to remove some or all of the fuel present in the fuel tank of an aircraft or other vehicle. Means which have hitherto been proposed for withdrawing fuel from a dispensing hose, or from the gallery lines or tanks of aircraft and the like, necessitate returning the fuel to the bulk storage tank or auxiliary tanks forming a part of the static installation. This involves the provision of additional fuel-return pipe lines between the several dispensing stations and the bulk storage tank and/or pumping station and also entails substantial operating difficulties.

It is an object of this invention to provide an improved apparatus for dispensing liquid to and withdrawing liquid from a receptacle or hose by the use of an auxiliary tank or container that is vacuumized during a previous dispensing operation by a suction device, such as an eductor, which is actuated by liquid flow during a dispensing operation, whereby the operation of any power-operated device during the withdrawal of liquid as well as the provision of any vacuumizing device requiring a separate source of power is obviated.

A further object is to provide an apparatus of the type described wherein the liquid withdrawn from the receptacle into an auxiliary container without the use of a pump is subsequently dispensed from the apparatus without return to the static supply system or storage system, this dispensing of the previously withdrawn liquid being effected automatically upon the commencement of the next dispensing operation without the manipulation of valves or special act-on-the part of an operator.

Further objects will become apparent from the following description.

In summary, in its broadest aspect, the invention comprises a liquid flow duct having means for connecting the upstream end thereof to the supply source of liquid and means for connecting the downstream end thereof to the tank to be serviced, said flow duct including at an intermediate part thereof a liquid flow-operated suction device, such as an eductor, for generating a partial vacuum when liquid flows through said device; a closed auxiliary container connected to said suction device by a non-return valve disposed to permit flow only from the closed container to the suction device, whereby a partial vacuum can be established and maintained in said closed container; a suction withdrawal connection including a withdrawal control valve between the closed container and the flow duct, preferably although optionally connected thereto downstream from the suction device, whereby suction can be applied to the flow duct by opening the withdrawal control valve; and shut-off means in the flow duct situated upstream from the connection thereto of said suction withdrawal connection for isolating at least a part of the flow duct downstream from said shut-off means against influx of fluid from upstream parts, e. g., from the supply source or from the atmosphere when the apparatus is disconnected from said source. It will be understood that the said isolated part of the flow duct may include only the parts thereof downstream from the suction withdrawal connection (thereby excluding the suction device should the connection be downstream therefrom) but may include additional or all parts of the apparatus, for example, a liquid supply hose when the shut-off means is a valve at the intake end of such hose. The downstream end of the flow duct is a dispensing conduit which normally includes a dispensing hose; the latter may be provided with an additional shut-off valve at the discharge end thereof to isolate it against entry of fluid, such as atmospheric air, e. g., when it is desired to collapse the hose, but this arrangement is optional.

The eductor may be inserted in the flow duct between the liquid supply line leading from the supply source and the dispensing conduit leading to the receptacle to be filled, so that all the liquid supplied to the said receptacle flows through the eductor. Since, however, the function of the eductor is merely to maintain a predetermined degree of vacuum in the auxiliary container it is not in general necessary that all the liquid should pass through the eductor. It is preferred to provide diversion valve means for diverting some or all of the liquid stream into the eductor as a vacuum-generating stream whenever the pressure in the auxiliary container rises above a predetermined value and to by-pass the eductor at other times. Such means may be operated manually, but preferably the diversion valve means is operated automatically by a pressure-responsive control device which is actuated in dependence on the pressure in the auxiliary container.

Such pressure-responsive control device may comprise a diaphragm or piston which is linked to the diversion valve means and is urged by a restoring force, for example a spring, in the direction tending to cause the diversion valve means to divert the liquid stream into the eductor, and in the opposite direction by a reduced pressure in the chamber containing the diaphragm or piston.

A pilot valve may be provided which is actuated by the pressure in the auxiliary container in such a way that, when this pressure is above a predetermined value, the chamber containing the said diaphragm or piston is connected with a source of gas at a pressure above the reduced pressure prevailing in the closed auxiliary container, e. g., the atmosphere, and, when the pressure falls below that value, the chamber is connected with the auxiliary container.

In a preferred form of the invention, the eductor is situated in one of two parallel branches of the liquid supply line, with the discharge from the eductor returning to the flow duct, the other of said branches being a by-pass pipe and the branched flow duct being provided with a diversion valve. The suction inlet of the eductor is connected with a line leading preferably to the bottom of the auxiliary container, by way of a non-return valve permitting flow of liquid or vapor from the container to the eductor but not in the reverse direction.

The diversion valve in the liquid flow duct may be of the butterfly type and mounted in the said by-pass pipe and may optionally be pivoted in such a manner that it is out of balance to the liquid stream and tends to be moved thereby into the closed position, the latter position being that in which the liquid is compelled to flow through the branch which contains the eductor. The pivot shaft of the valve extends through a bushing in the pipe wall and is connected by a lever and connecting rod with a movable wall having a surface exposed to the pressure within a chamber, hereinafter referred to as the main chamber. The latter may conveniently be fixed to or made integral with the wall of the pipe. The said movable wall may be embodied as a piston, the main chamber being internally cylindrical. Further, the said wall may be provided with a spring which is preferably of such strength that, if atmospheric pressure obtains on both sides of the wall, the spring can just close the diversion valve. The provision of a spring is not, however, essential, as the unbalance of the valve could be made itself sufficient to provide the restoring force necessary to close the diversion valve.

The part of the main chamber enclosed by the piston can be connected by way of a pilot valve with atmosphere or with a pipe leading to the top of the auxiliary container. The pilot valve may comprise a plunger operating in a cylinder, hereinafter called the pilot cylinder, which is at all times connected with the pipe leading to the top of the auxiliary container, so that vacuum in the latter tends to move the plunger in one direction against the action of a spring.

When the invention is applied to an aircraft static fuelling system, the auxiliary container may conveniently be mounted on the fuel dispensing truck carrying the dispensing hose which then forms a part of the dispensing conduit means. The truck may also carry hose reels interconnected by a pipe that has the eductor connected intermediate the ends thereof. If desired this pipe may be provided with a filter, an air eliminator and a meter. The air eliminator should be provided with a non-return valve which allows the expelled air to escape to atmosphere, but does not allow air to enter when the system is under suction.

The invention will now be described in detail by reference to some preferred embodiments suitable for use in the fuelling of aircraft and by reference to the attached drawings.

Figure 2:
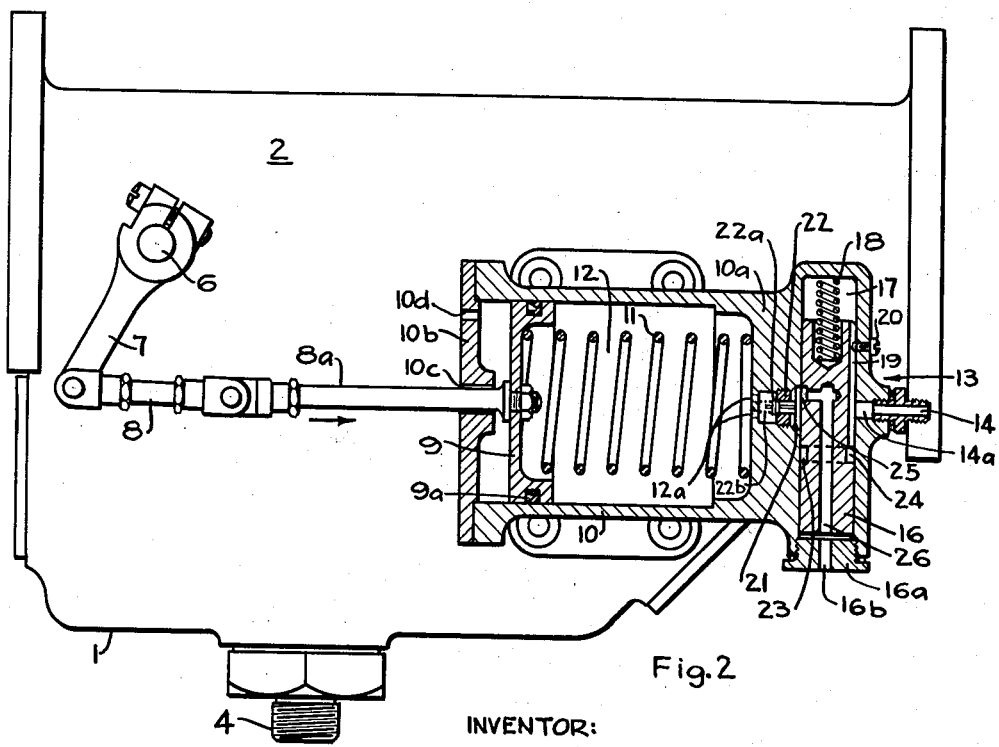
Figure 4:
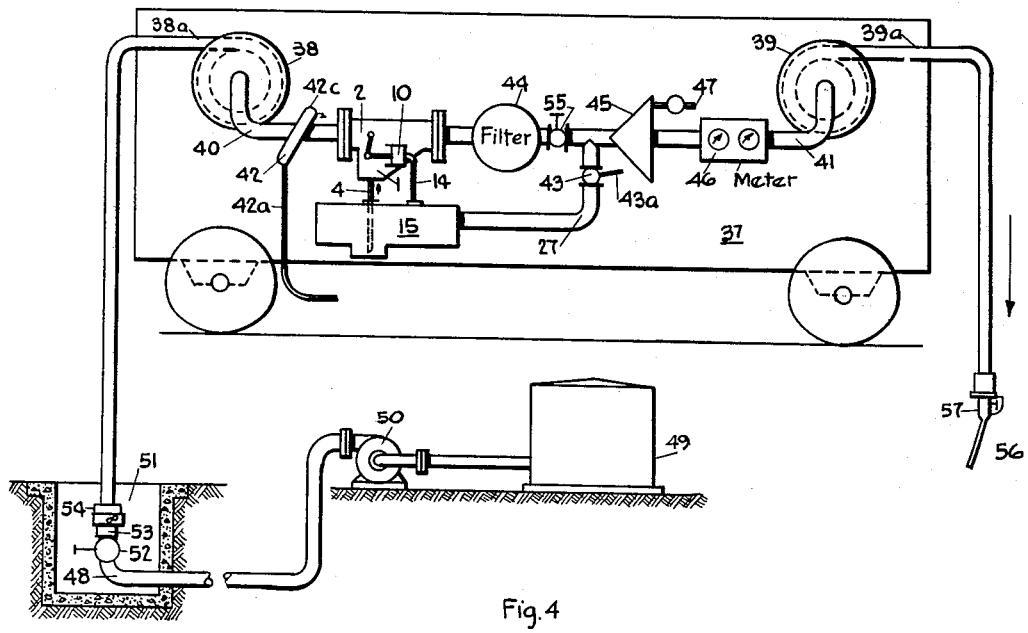
Figure 3:
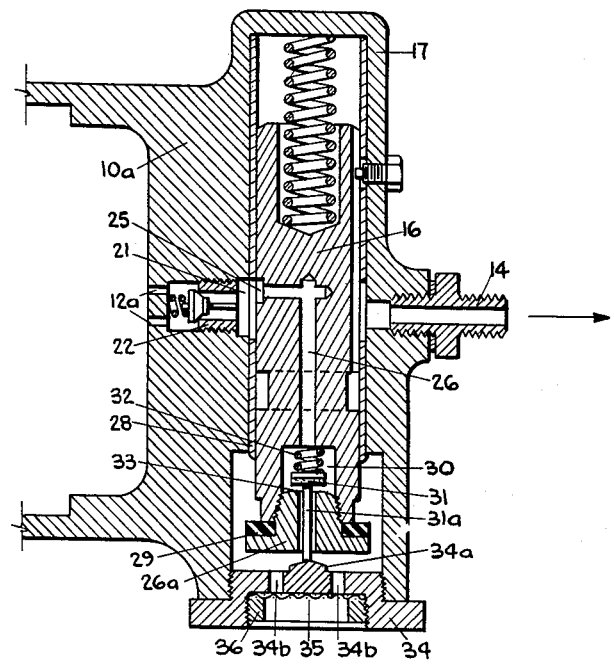

In the accompanying drawings forming a part of this specification:

Figure 1 is a longitudinal section of a branched flow duct provided with an eductor, Figure 2 is a longitudinal section of the control device including a pilot valve, Figure 3 is a longitudinal section of an alternative form of pilot valve on an enlarged scale, and Figure 4 is a diagrammatic assembly view of a fuel dispensing system.

Referring to Figures 1 and 2, the eductor 1 is mounted on the liquid by-pass pipe 2, the said eductor and by-pass pipe forming parallel branches of the upstream part of a liquid flow duct; the downstream part of this flow duct consists of the conduit elements, to be described and shown in Figure 4, which receive liquid from the eductor and by-pass pipe. The upstream end of the pipe 2 (at the left in Figure 1) communicates with the pressure inlet I of the eductor and the downstream end of the pipe communicates with the discharge D of the eductor, a diversion valve 3 being mounted in the by-pass pipe 2 between the said ends thereof. The diversion valve 3 controls the distribution of the liquid between the eductor 1 and the liquid by-pass pipe 2. The suction inlet of the eductor communicates with a space S that is connected with a pipe 4 leading to the bottom of the auxiliary container 15 (Figure 4, also herein referred to as a vacuumized auxiliary tank), by way of a non-return valve 5 having a spring 5a permitting flow from the container to the eductor but not in the reverse direction.

The diversion valve 3 is of the butterfly type and is pivoted on a shaft 6 about an axis below the center line of the pipe 2, so that it is out of balance to the liquid stream and tends to be rotated thereby in a clockwise direction into the closed position shown in Figure 1, the latter position being that in which the liquid is compelled to flow through the eductor. This unbalanced mounting of the valve is, of course, optional. The pivot shaft 6 of the valve extends through a bushing (not shown) in the pipe wall and is connected by a lever 7, a pivoted link 8 and connecting rod 8a with a piston 9 moving in an internally cylindrical chamber 10 fixed to the wall of the eductor 1. The piston is advantageously provided with sealing means such as a ring 9a made of flexible material. The chamber 10 is herein called the main chamber. The rear end of the chamber 10 is closed by an integral end wall 10a, and the front end may be closed by a cover 10b having a central opening 10c for the rod 8 and a large vent 10d. The piston is provided with a spring 11 which is preferably of such strength that, if atmospheric pressure obtains on both sides of the piston, the spring can just close the valve. The provision of a spring is not, however, essential, as the unbalance of the valve could be made itself sufficient to provide the restoring force necessary to close the diversion valve.

The rear wall 10a of the main chamber 10 has ports 12a communicating with the space 12 which is enclosed by the piston 9, whereby the latter space can be connected by way of a pilot valve 13 with atmosphere or with a pipe 14 leading to the top of the auxiliary container 15. The pilot valve comprises a plunger 16 slidable within a hollow pilot cylinder 17, which is formed integrally with the chamber 10 and is at all times connected with the pipe 14 through a port 14a, so that vacuum in the auxiliary container 15 reduces the pressure acting against the top of the plunger, thereby permitting the latter to move upwards against the action of a plunger spring 18 under the face of the higher, atmospheric pressure that acts against the bottom of the plunger. The plunger is retained by a threaded plug 16a having a port 16b communicating with the atmosphere, whereby the lower face of the plunger is subjected to atmospheric pressure. Flow communication of the pilot cylinder 17 with the auxiliary container 15 is effected by way of an axial channel or groove 19 in the plunger 16 on the side toward the port 14a. This channel serves also as a key way for a set screw 20 which prevents the plunger from rotating; the screw extends only partly to the bottom of the groove 19 so as not to interrupt the said communication. One wall of the pilot cylinder 17 is provided with a bore 21 communicating with the ports 12a and the space 12 of chamber 10 by way of leaky non-return valve 22 which is mounted within the bore 21. The valve 22 has a movable valve member 22a secured to its seat by a spring 22b and allows free flow of air from pilot cylinder 17 into space 12, but allows only a restricted flow or leak of air in the reverse direction. This is effected, for example, by roughening the seat of the valve 22 and/or the seating surface of the valve member 22a, or by otherwise providing fine orifices or by-pass passages that are not sealed by the valve member. The periphery of the plunger 16 is provided with a recess 23 which communicates by a peripheral channel 24 and the groove 19 with the pipe 14. The plunger also has a recess 25 which communicates by way of a central bore 26 and port 16b, with atmosphere.

It is evident that the pressure acting on the upper end of the pilot valve plunger 16 is at all times equal to that within the auxiliary container 15. The positions of the port 21 in the pilot cylinder wall, and of the recesses 23 and 25 in the plunger 16, are such that, when the upper face of the plunger is exposed to atmospheric pressure (due to an absence of vacuum in the auxiliary container), the plunger is moved downwards by its spring 18 into a position in which the recess 25 is in registry with the port 21, as shown on the drawing, placing the port 21 and space 12 into communication with the atmosphere. If, on the other hand, the pressure in the auxiliary container 15 falls to and below a predetermined maximum, the plunger 16 moves upwards to a position in which the recess 23 is in registry with the port 21 while the recess 25 is out of registry therewith; hence the port 21 and space 12 are thereby isolated from the atmosphere and placed into communication with the pipe 14 and the auxiliary container 15.

The operation of the diversion valve and the actuating means therefor can now be described. Assuming that there is no vacuum initially in the auxiliary container 15, the plunger 16 is initially in its lower position as shown in Figure 2, thereby placing the port 21 into communication with the atmosphere through the port 16b and admitting air freely through the leaky check valve 22 into the space 12 until the pressure in the latter is atmospheric. The pressures on the opposite sides of the piston 9 being approximately equal, the spring 11 (when provided) moves the piston to the left to the position shown, thereby rotating the shaft 6 and diversion valve 3 in a clockwise direction to close the main part of the supply pipe 2. (When the spring 11 is omitted the diversion valve 3 is moved to closed position by the action of the liquid against the unbalanced surfaces of the valve upon commencement of liquid flow.) When liquid is admitted to the left end of the liquid flow duct from the supply source, all of the liquid is diverted by the closed diversion valve from the by-pass pipe 2 and flows through the eductor 1, to form the vacuum-generating stream. This lowers the pressure in the suction space S, causing the check valve 5 to open against its spring and sucks from the auxiliary container 15 through the pipe 4 air and/or any liquid remaining in that container from a previous operation. This air and/or liquid is carried out of the eductor with the liquid supplied to the flow duct and is discharged from the right end thereof. When the pressure in the auxiliary container 15 has fallen to the desired maximum value, the pilot valve plunger 16 moves upwards, thereby first isolating the space 12 from the atmosphere and thereafter placing it into communication with the pipe 14 and auxiliary container 15 by way of the restricted orifice or flow passage afforded by the leaky check valve 22, the valve member 22a of which remains closed. The air is therefore slowly withdrawn from the space 12 into the container 15. After a delay, during which the pressure in the auxiliary container 15 continues to fall, due to the continued suction of the eductor, the vacuum in the space 12 becomes sufficient to permit the face of atmospheric pressure acting on the outer face of the piston 9 to move the latter to the right against the action of the spring 11 (or against the unbalance force of the valve 3, when no spring 11 is used) into a position in which it opens the butterfly diversion valve 3, thus allowing the free flow of liquid through the by-pass pipe 2 and reducing to a negligible quantity the flow of liquid through the eductor 1. This reduces the pressure drop through the system. The check valve 5 closes when the pressure in the space S approaches that in the auxiliary container 15, thereby maintaining the vacuum in the latter.

If, as is usually the case, there is a slight leakage of air into the low pressure system, e. g., by flow past the rings 9a of the piston or from some other entry point, the piston 9 and plunger 16 maintain their last-mentioned positions until the pressure rises above the said predetermined maximum, whereupon the plunger 16 moves downwards and the port 21 is placed into communication with the atmosphere. The valve member 22a then leaves its seat against the action of the spring 22b and permits the rapid influx of air into the space 12, whereby the piston 9 is again moved to close the diversion valve 3.

A predetermined degree of vacuum is thus maintained in the auxiliary container 15 during the dispensing operation when liquid flows through the device from the source of liquid supply, and for some time thereafter. When the dispensing operation is completed, the dispensing part of the system is isolated from the supply source of the liquid by suitable valve means, as described below, and connected to the container 15 through the pipe 27 (herein called the suction withdrawal connection) and withdrawal control valve 43 until all, or until the desired quantity, of liquid in the dispensing part or in a receptacle connected thereto, has been sucked into this container. The "dispensing part of system" includes at least the part of the system downstream from the juncture with the suction withdrawal connection 27; however, if desired, it may include the pipe 2 and eductor 1 and other elements such as a supply hose, as described later.

In order to prevent leakage of air around the running clearance between the pilot cylinder 17 and plunger 16, when the latter is in its upper position, the former may be provided, as shown in Figure 3, with a sleeve 28 fitting it in an air-tight manner and projecting beyond the cylinder bore into an enlarged lower chamber formed at the lower end of the cylinder 17, as shown, to form an annular seat for a resilient washer 29 that is fixed to the plunger 16 by a threaded, centrally bored plug 26a, both situated within said enlarged chamber, so that when the plunger moves to the position corresponding with low pressure in the auxiliary container, the face of the washer 29 comes into contact with the end of the sleeve 28 and seals the clearance between the plunger and the sleeve. Likewise the central bore 26 of the plunger 16 may communicate with atmosphere by way of an enlarged chamber 30 formed at the lower end of the plunger and containing a valve member 31 which is normally held by a spring 32 against an annular seat 33 that projects beyond the upper face of the plug 26a about the bore thereof, so as to seal the chamber from atmosphere. The valve 31 has a stem 31a which passes loosely through the bore of the plug 26a and protrudes therefrom. When the plunger 16 moves to the position corresponding with atmospheric pressure in the auxiliary container, the protruding end of the stem 31a abuts on a projection 34a on a threaded plug 34 secured into the base of the cylinder 17 and the valve 31 is lifted from its seat 33, thus allowing air to pass up the bore 26. The plug 34 has inlet ports 34b that are covered with a filter 35 to prevent the entry of dust which might cause wear and jamming of the plunger while admitting air. Threaded ring 36 retains the filter.

Referring now to Figure 4, the parts previously described and shown in the other views, including the eductor 1, liquid by-pass pipe 2 and auxiliary container 15, are mounted on a suitable platform 37, which may for example be a part of a truck that can be moved to the vicinity of an aircraft to be fuelled. Also mounted on the truck platform 37 are two rotatable hose reels 38 and 39 carrying the liquid supply hose 38a and the liquid dispensing hose 39a. The inner ends of these hoses, near the hubs of the reels, are connected by suitable conduits including rotatably reeled elements to pipes 40 and 41, respectively, that are stationary on the truck platform 37 and are connected to the pressure inlet and discharge ends, respectively, of the liquid by-pass pipe 2 through other flow elements to be described.

The upstream pipe 40 at the liquid supply end of the system is preferably, although optionally, provided with a pressure control valve 42 which may have a control line 42a; the latter can be connected to the receptacle to be filled, e. g., the fuel tank of the aircraft, so that the pressure in the control line increases when the pressure within the tank increases (as would occur, for example, when fuel is delivered too rapidly). The valve 42 may be of the type described in the German Patent No. 876,345.

In summary, such valves have a bias element such as a spring or gas-loaded diaphragm or plunger contained within a dome 42c thereof tending to keep the valve normally fully open; when the pressure within the control line 42a rises above a predetermined maximum the valve closes partly or entirely to restrict or shut off the flow of liquid. It is evident that the valve 42, being normally open, would not interfere with the passage of liquid although the line 42a were not connected to the receptacle being filled, so that the installation is not restricted to use with receptacles having special fittings for the control line.

The downstream pipe 41, at the dispensing end of the system, is connected to the auxiliary container 15 by a suction withdrawal connection 27 that enters the tank preferably near the top of the tank and has a withdrawal control valve 43 by which the container 15 can be normally isolated from the dispensing end of the system and by which it can be connected thereto for withdrawing liquid. The valve 43 is preferably spring loaded toward closed position, so as to remain open only while an operator applies force to the handle 43a. The pipe 41 is further advantageously provided with a filter 44, an air eliminator 45 and a meter 46. The air eliminator is provided with any suitable elements for separating entrained air and for venting such air without discharging liquid, e. g., by a float chamber and float-controlled outlet valve (not shown), as are well known in the art. The air vent is provided with a non-return valve 47 that permits the separated air to be expelled to the atmosphere but does not permit air to enter the system; the latter feature is significant when the system is under vacuum, as when the valve 43 is open. The sequential arrangement of the filter, air eliminator, meter and connection to the pipe 27 illustrated, while preferred, is optional. It is, however, desirable to locate the filter upstream from the meter and to locate the meter downstream from the junction of the suction withdrawal connection 27, as shown, whereby the meter can measure the liquid dispensed as well as the liquid withdrawn. The pipe 41 and the elements connected in it and downstream thereof, such as the hose 39a, are collectively herein called the dispensing conduit. These parts, together with the eductor 1, pipes 2 and 40 and the hose 38a form a liquid flow duct.

A part of the supply source of the liquid is represented in Figure 4 by a static pipe system comprising an underground pipe 48 the inlet of which is supplied with liquid, e. g., fuel, from a bulk storage tank 49 pressurized by a suitable pump 50, which may be of the centrifugal type and be operated continuously. The discharge end of the pipe 48 is situated in a pit 51 and is fitted with a shut-off valve 52 and a coupler 53 of any approved type to which the supply hose 38a can be connected. It should be understood there may be several such pits at various parts of an airfield. The valve and coupling arrangements within the pit form no part of the present invention and any approved arrangements may be used, e. g., valves that are self-closing when the hose is uncoupled therefrom and that are opened automatically when the hose is coupled thereto or that can be opened manually only after the hose is coupled thereto.

The free end of the hose 38a is preferably, although optionally, provided with a valve 54. To avoid dissipation of the vacuum in the tank 15 and spillage of fuel, it is advantageous to select the valve 54 of the type that is spring-loaded to closed position and opens automatically upon being coupled to the coupler 53. In lieu of or in addition to the valve 54, there may be a valve 55 in the liquid flow duct at any point upstream from the juncture of the pipes 27 and 41. The free end of the hose 39a is provided with a nozzle 56 adapted to be fitted to the receptacle to be filled; the nozzle may be provided with a valve 57 which may be either manually operated or of the type that is opened automatically when the nozzle is connected to the receptacle. The valves at the ends of the hoses being well known per se, no further description thereof is deemed to be necessary herein. It should be noted that a closure for the end of the hose 39a, such as the valve 57, is strictly necessary only when it is desired to collapse the hose following a dispensing operation. Thus, the delivery of liquid can also be controlled by the valve 55.

In operation, the truck carrying the platform 37 is moved to a position near the aircraft to be fuelled and near a convenient pit 51 and the upstream supply hose 38a is coupled to the pipe 48, the valves 52 and 54 being opened either manually or automatically. The nozzle 56 at the end of the dispensing hose 39a is connected to the receptacle to be fuelled (not shown) and the valve 57 is opened, either manually or automatically. The valve 43 being closed and the valve 55 open, fuel flows through the hoses into the said receptacle, passing either through the eductor 1 or through the by-pass pipe 2 in accordance with the position of the diversion valve 3 in the latter, the position of the latter being determined by the pressure in the auxiliary container 15 as was described heretofore. If an adequate vacuum was not initially present in the auxiliary container (as when it contains an excess of air or liquid from a previous operation) the air and/or liquid are sucked up through the pipe 4 and discharged from the right end of the eductor 1 together with the fresh liquid supplied through the hose 38a; air thus drawn in is eliminated in the air eliminator 45.

When the desired quantity of liquid has been dispensed into the receptacle, as when the latter is full, the hoses are uncoupled and their valves are closed. The withdrawal control valve 43 is now opened, extending the vacuum in the auxiliary container 15 to all of the dispensing part of the system, i. e., the part downstream from the closed valve 54. (When the valve 55 is provided, it may be closed at this stage; in this case the vacuum is extended to all parts of the system downstream from the valve 55.) Fuel is therefore withdrawn from the dispensing parts of the system into the container 15, and any fuel which has passed through the meter 46 now acts in the reverse sense on the meter, so that such fuel is not included in the total registered. When the hoses are of the collapsible type, they are flattened by the atmospheric pressure, facilitating handling and re-winding of the hoses on the reels. It is evident that liquid withdrawn from the supply hose 38a into the container will not be registered on the meter 46.

If it is desired to withdraw fuel from the gallery lines or from the aircraft tank itself, the downstream hose 39a is, of course, left coupled to the tank while the valve 54 or 55 is closed and the valves 43 and 57 are kept opened for the time required to withdraw the desired amount of fuel. Similarly, when the device is to be used only for withdrawing fuel there is no need to connect the hose 38a to any pit; it is, however, in this case necessary that the auxiliary container 15 be initially under vacuum from a prior fuelling operation.

During the next fuelling operation, the fuel which is now present in the auxiliary container 15 is drawn into the eductor 1 and mingles with the fresh supply of fuel during the first stages of the fuelling operation. It is a highly useful feature of the invention that the diversion valve 3 diverts the flow through the eductor only a small part of the duration of the fuelling operation and permits the passage of most of the fuel through the larger by-pass pipe 2 as soon as a sufficient vacuum has built up in the auxiliary container, thereby avoiding a needless pressure drop in the device during the later stages of the fuelling operation and permitting delivery at greater rates of flow with a given supply pressure.

I claim as my invention:

1. Apparatus for dispensing liquid into and withdrawing liquid from receptacles or the like comprising: a liquid flow duct adapted to be connected at one end thereof to a source of said liquid under pressure and having at the other end thereof coupling means adapted to be connected to said receptacle; a closed vacuumized auxiliary container; a suction withdrawal connection between said auxiliary container and said liquid flow duct for applying suction to the flow duct; a liquid flow-operated suction device for generating a partial vacuum having a suction inlet and connected in said flow duct for actuation by liquid flowing through said flow duct; and a connection between said auxiliary container and said suction inlet of the suction device for vacuumizing said auxiliary container.

2. Apparatus according to claim 1 wherein said suction device is an eductor.

3. Apparatus for dispensing liquid and withdrawing liquid from a receptacle or the like and suitable for use in connection with a supply source of liquid under pressure, comprising, in combination: a liquid flow duct including a liquid flow-operated suction device connected to be actuated by the flow of liquid through the flow duct, said device having a pressure inlet adapted for connection to said supply source, a suction inlet, and an outlet, said flow duct including further a dispensing conduit connected to said outlet; a closed auxiliary container; a non-return valve connected between said auxiliary container and the said suction inlet, said non-return valve being disposed to allow flow only from the auxiliary container into said suction inlet for evacuating said auxiliary container; a suction withdrawal connection including a withdrawal control valve between said auxiliary container and said liquid flow duct; and shut-off means in said liquid flow duct situated upstream from said suction withdrawal connection for isolating the part of said liquid flow duct which is downstream from the shut-off means, whereby the suction from said auxiliary container, applied to the liquid flow duct through said suction withdrawal connection when said withdrawal control valve is opened, can be restricted to said downstream part of the liquid flow duct.

4. Apparatus according to claim 3 wherein said liquid flow duct includes: a liquid by-pass pipe connected to said suction device both at said pressure inlet and at said outlet thereof to provide a by-pass for the flow of liquid past the suction device; and diversion valve means for controlling the distribution between said suction device and said by-pass pipe of liquid which flows from said source of liquid through said flow duct.

5. Apparatus as claimed in claim 4 wherein said diversion valve means includes a pressure-responsive actuating device, said actuating device being connected to said closed auxiliary container to respond to the pressure therein and being disposed to actuate the diversion valve means to increase the flow of liquid through the suction device in response to a rise in said pressure and to decrease said flow in response to a fall in said pressure, thereby maintaining a reduced pressure within said closed auxiliary container.

6. Apparatus as claimed in claim 5 wherein said actuating device includes: a closed main chamber having a movable wall exposed to the inside of said chamber; linkage interconnecting said wall and the diversion valve means for actuating the latter means as said wall moves in accordance with changes in pressure within said main chamber; and a flow connection between said closed auxiliary container and said closed main chamber for applying a suction from the former to the latter.

7. Apparatus as claimed in claim 6 wherein the said flow connection is provided with a two-way pilot valve disposed to connect said main chamber selectively to said closed auxiliary container for applying a suction as stated in claim 4 or to a source of gas at a pressure higher than the said reduced pressure within the closed auxiliary container.

8. Apparatus according to claim 7 wherein the said source of gas is the ambient atmosphere and the said gas is air.

9. Apparatus according to claim 7 wherein said pilot valve is provided with actuating means including a pressure-responsive element exposed to the pressure within said closed auxiliary container, said pilot valve being arranged to connect said main chamber to said source of gas when the pressure within the closed auxiliary container rises above a predetermined maximum value and to connect said main chamber to said closed auxiliary container when the pressure in the latter falls below said predetermined maximum value.

10. Apparatus as claimed in claim 6 wherein the said flow connection is provided with a two-way pilot valve disposed to connect said main chamber selectively to said closed auxiliary container for applying a suction as stated in claim 4 or to a source of gas at a pressure higher than the said reduced pressure within the closed auxiliary container, said pilot valve including: a hollow pilot valve cylinder communicating by a first inlet thereof with said source of gas, by a second inlet thereof with said flow connection to the closed auxiliary container and by a third inlet thereof to said main chamber; a reciprocable plunger within said cylinder; a spring urging said plunger for movement toward one direction, said plunger having a surface toward the said one direction exposed to a space communicating with said first inlet and having a surface toward the opposite direction exposed to a space communicating with said second inlet, whereby said plunger is urged in opposition to said spring by the differential of the pressures in said first and second inlets; and passageways formed in said pilot valve and controlled by the said plunger for interconnecting the first and third inlets in one position of the plunger and for interconnecting the second and third inlets in another position of the plunger.

11. Apparatus according to claim 10 wherein the said linkage connected to the movable wall is disposed to move the diversion valve to divert a relatively greater amount of liquid through the eductor when the wall is moved outwardly from said main chamber; wherein said passageways of the pilot are disposed to interconnect the said first and third inlets when the plunger is moved in the said one direction upon a fall in the said differential of the pressures and to interconnect said second and third inlets when the plunger is moved in the opposite direction in response to an increase in said differential of the pressures; and wherein said flow connection is further provided with a leaky non-return valve between said third inlet of the pilot valve and the said main chamber, said non-return valve being disposed to open to permit rapid flow of gas into the main chamber and providing only a restricted flow passage for leakage of gas in the opposite direction.

12. Apparatus as claimed in claim 5 wherein said actuating device includes: a closed main chamber having a movable wall exposed to the inside of said chamber; linkage interconnecting said wall and the diversion valve means, disposed to move the said valve means to divert a relatively greater amount of liquid through the suction device when the wall is moved outwardly from said main chamber in response to a rise of pressure therein; and means including a flow connection between said main chamber and said closed chamber for applying a pressure to said main chamber that rises with a rise in pressure in the closed container and falls with a fall in pressure therein.

13. Apparatus according to claim 12 wherein said diversion valve means comprises a movable valve member situated within said liquid by-pass pipe and pivotally mounted out of balance so that the flow of liquid through said liquid by-pass pipe tends to close the valve for diverting liquid through the suction device.

14. Apparatus according to claim 12 wherein said main chamber is internally cylindrical, said movable wall thereof is a piston, and said piston is provided with a spring urging said piston outwardly, thereby urging said diversion valve means to be moved to a position to divert a relatively greater amount of liquid through the suction device.

15. Apparatus according to claim 12 wherein said means for applying a pressure to said main chamber comprises a pilot valve for selectively connecting said main chamber to said closed auxiliary container for applying a suction to the main chamber or to the atmosphere to admit air at atmospheric pressure to said main chamber.

16. Apparatus according to claim 3 wherein the said non-return valve is connected for direct communication with the bottom of the closed auxiliary container, whereby the liquid in the bottom of said auxiliary container will be sucked into the suction device when liquid is diverted for flow through the eductor.

17. Apparatus as claimed in claim 3 wherein said liquid flow duct further includes a supply hose connected at the downstream end thereof to the pressure inlet of said suction device and having a coupler at the upstream end thereof adapted for connection to said source of liquid supply, said shut-off means including a valve at the said upstream end of the supply hose.

18. Apparatus as claimed in claim 3 wherein said dispensing conduit includes a dispensing hose having at the downstream end thereof a coupler adapted for connection to a receptacle to be serviced, whereby liquid can be withdrawn from said receptacle when said shut-off means is closed and said withdrawal control valve is open.

19. Apparatus according to claim 3 wherein said suction withdrawal connection is connected to said liquid flow duct at a point downstream from the suction device, whereby suction can be applied to said dispensing conduit directly without communication through said suction device.

20. Apparatus for fuelling and defuelling tanks of vehicles such as aircraft and suitable for use with a supply source of liquid fuel under pressure, comprising, in combination: a liquid fuel flow duct including at the upstream end thereof a supply conduit, at the downstream end thereof a dispensing conduit, and at an intermediate part thereof an eductor, said eductor having a suction inlet, said supply and dispensing conduits being the sole connections for admitting liquid fuel to and discharging liquid fuel from said apparatus; a closed auxiliary container; a non-return valve connected between said auxiliary container and said suction inlet, said non-return valve being disposed to allow flow only from said auxiliary container to said suction inlet for evacuating said container; a suction withdrawal connection including a withdrawal control valve interconnecting said auxiliary container and said flow duct; and isolating means in said closed flow duct situated upstream from the connection thereto of said suction withdrawal connection for isolating the portion of the flow duct downstream from said isolating means against influx of fluid, whereby partial vacuum applied from said auxiliary container to the flow duct through said suction withdrawal connection when said withdrawal control valve is opened can be restricted to the said downstream portion of the flow duct.

21. Mobile apparatus for fuelling and defuelling tanks of vehicles such as aircraft at airports providing static supply sources of liquid fuel under pressure, said apparatus comprising in combination: a mobile support carrying a liquid flow duct including a flexible supply conduit at the upstream end thereof adapted to be connected to said supply sources and to receive fuel therefrom, a dispensing hose at the downstream end thereof adapted to be connected to said vehicle tank and including further at an intermediate part thereof at least two branches in parallel, of which the first is a by-pass pipe and the second is a liquid flow-operated suction device for generating a partial vacuum by the flow of liquid through said second branch, said suction device having a suction inlet; a diversion valve for controlling the distribution of liquid fuel flow between said branches; a closed auxiliary container on said mobile support; a non-return valve connected between said auxiliary container and said suction inlet, said non-return valve being disposed to allow flow only from said auxiliary container to said suction inlet for evacuating said container; actuating means for said diversion valve responsive to the pressure in said auxiliary container disposed to actuate the diversion valve to increase the flow of liquid through said second branch at the expense of the liquid flow through said first branch in response to a rise in said pressure and to decrease the flow of liquid through said second branch while increasing the liquid flow through said first branch in response to a fall in said pressure; a suction withdrawal connection including a withdrawal control valve interconnecting said auxiliary container and said flow duct; and shut-off means in said flow duct situated upstream from the connection thereto of said withdrawal suction connection for isolating the portion of the flow duct downstream from said shut-off means against influx of fluid, whereby partial vacuum applied from said auxiliary container to the flow duct through said suction withdrawal connection when said withdrawal control valve is opened can be restricted to the said downstream portion of the flow duct.

22. Mobile apparatus for fuelling and defuelling tanks of vehicles such as aircraft at airports providing static supply sources of liquid fuel under pressure, said apparatus comprising: a mobile support carrying a liquid flow duct including a supply hose at the upstream end thereof adapted to be connected to said supply sources to receive liquid fuel therefrom and a dispensing hose at the downstream end thereof adapted to be connected to said vehicle tank, said mobile support carrying further a hose reel for each of said hoses providing flow communication between the inner ends of the hoses and the adjoining parts of the flow duct, said flow duct including further at an intermediate part thereof an eductor having a pressure inlet connected to receive liquid fuel from said supply hose, an outlet connected to discharge into said dispensing hose, and a suction inlet; a closed auxiliary container on said mobile support; a non-return valve connected between said auxiliary container and said suction inlet through a pipe extending to the bottom of the auxiliary container, said non-return valve being disposed to allow flow only from said auxiliary container to said eductor for evacuating said container; a suction withdrawal connection including a withdrawal control valve interconnecting said auxiliary container and said liquid flow duct; and valve means at the outer ends of said hoses, whereby said flow duct can be isolated against the outside for withdrawing liquid from said hoses into said auxiliary tank through said suction withdrawal connection when said withdrawal control valve is opened.

References Cited in the file of this patent

UNITED STATES PATENTS

| | | |
|---|---|---|
| 1,886,098 | Hedglon | Nov. 1, 1932 |
| 2,307,085 | Trexler | Jan. 5, 1943 |
| 2,537,266 | Granberg | Jan. 9, 1951 |
| 2,556,425 | Hinds | June 12, 1951 |
| 2,600,876 | Jauch et al. | June 17, 1952 |
| 2,650,003 | Coleman | Aug. 25, 1953 |